United States Patent [19]

Bell, Jr. et al.

[11] 4,242,560
[45] Dec. 30, 1980

[54] SERVO FEED SYSTEM FOR AN ELECTRICAL DISCHARGE MACHINING APPARATUS

[75] Inventors: Oliver A. Bell, Jr., Statesville; Randall C. Gilleland, Troutman; Davey J. Chance, Concord, all of N.C.

[73] Assignee: Colt Industries Operating Corp., New York, N.Y.

[21] Appl. No.: 23,630

[22] Filed: Mar. 26, 1979

[51] Int. Cl.³ .............................................. B23P 1/12
[52] U.S. Cl. ............................... 219/69 G; 219/69 C; 318/432; 318/678; 318/681
[58] Field of Search ............... 219/69 G, 69 C, 69 M; 318/677, 678, 681, 432

[56] References Cited

U.S. PATENT DOCUMENTS

| 3,485,992 | 12/1969 | Sennowitz | 219/69 G |
|---|---|---|---|
| 3,581,043 | 5/1971 | Ullmann | 219/69 G |
| 3,697,871 | 10/1972 | MacMullan | 318/678 |
| 3,793,502 | 2/1974 | Bell, Jr. | 219/69 G |
| 4,049,942 | 9/1977 | Balleys et al. | 219/69 M |
| 4,152,569 | 5/1979 | Bell, Jr. et al. | 219/69 G |

Primary Examiner—Thomas J. Kozma
Assistant Examiner—Clifford C. Shaw
Attorney, Agent, or Firm—Harry R. Dumont

[57] ABSTRACT

The servo circuit is operable both in a dual and in a single mode and includes an analog gate for multiple gap inputs. Dual operation is required where more than one gap is involved such as in the situation where multiple electrodes are carried by a common machine tool ram. In the servo operation, the unwanted information over a relatively wide voltage range is eliminated and the more significant voltage excursions around the 30 volt or gap breakdown voltage level are employed. This compensates for the non-linearity that is inherent in the electrical discharge machining gap.

7 Claims, 1 Drawing Figure

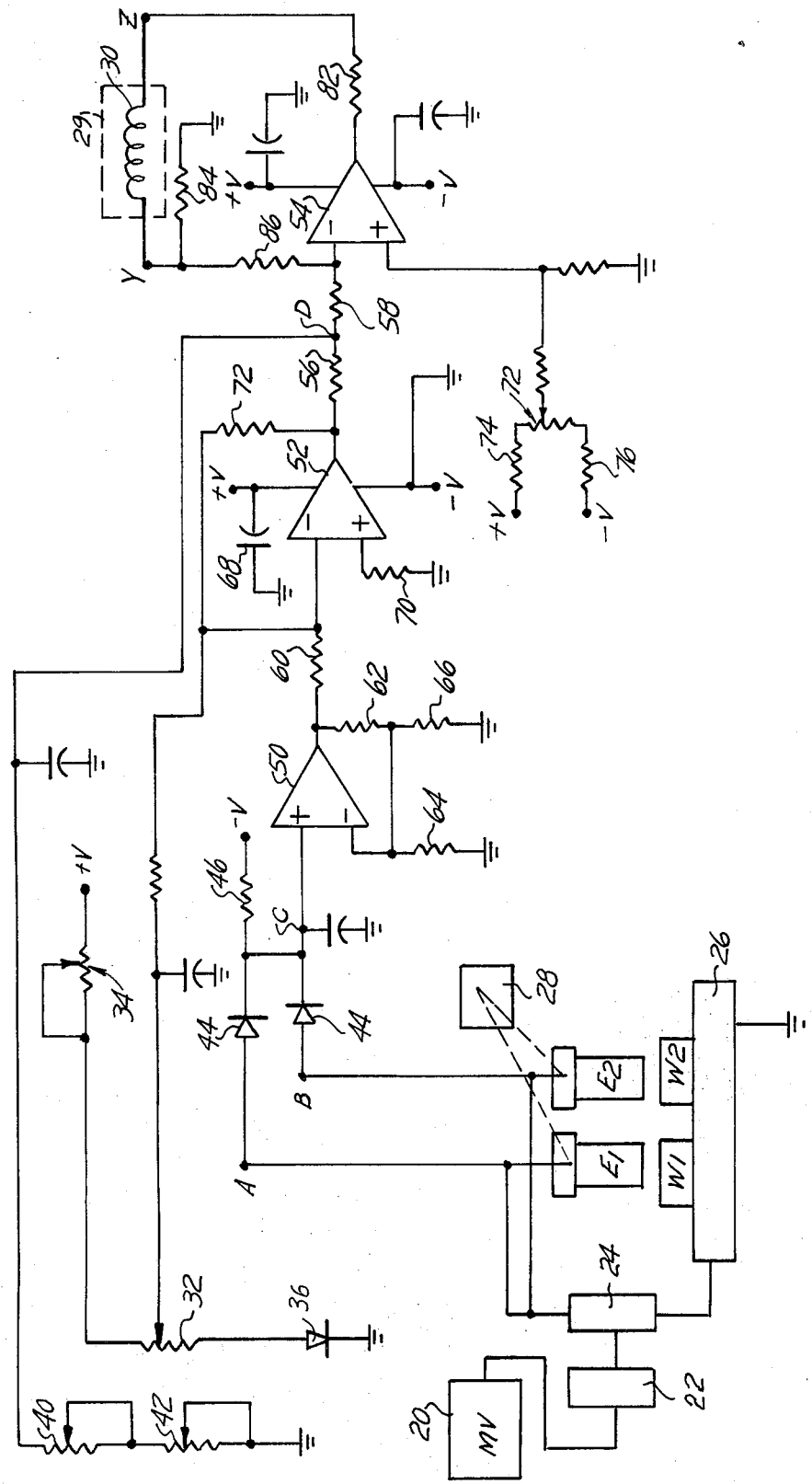

SERVO FEED SYSTEM FOR AN ELECTRICAL DISCHARGE MACHINING APPARATUS

BACKGROUND OF THE INVENTION

The field to which our invention relates is known as Electrical Discharge Machining, hereinafter referred to as "EDM" in which material is removed from an electrically conductive workpiece by the action of electrical gap discharges between one or more electrodes and the workpiece. The servo feed system is employed to provide relative movement thus to maintain a relatively constant and optimum gap spacing between the electrode and workpiece as material is progressively removed from the workpiece.

A dielectric fluid is circulated and recirculated, generally under pressure to the gap throughout the machining operation. For most reliable and dependable results, a power supply of the independent pulse generator type is utilized to provide machining power pulses of precisely controllable frequency and on/off times. One type of multivibrator, particularly suitable for EDM operation, is described and disclosed in Bell, U.S. Pat. No. 3,809,848, issued on May 7, 1974, for "Digitally Controlled Power Supply for Electrical Discharge Machining Apparatus".

SUMMARY OF THE PRESENT INVENTION

The present invention will be seen to relate to a novel servo feed system which is capable of handling a plurality of analog inputs from the gaps. It also operates to put the operating range in the linear operating range of the amplifier used in the servo system. Saturation of the amplifier is then used to suppress unwanted or unneeded information at the gap. Otherwise stated, the gap voltage information in which we are primarily interested is used and the remainder clipped off and discarded.

BRIEF DESCRIPTION OF THE DRAWINGS

Reference is now made to the accompanying drawing for a description of the circuit incorporating the present invention, with like reference numerals used to identify like parts as they may appear in the circuit. The drawing is a combined schematic and block diagrammatic showing of a complete electrical discharge machining power supply and servo feed system.

DETAILED DESCRIPTION OF THE PREFERRED EMBODIMENT

The drawing shows the basic parts of an EDM system which include a pulse generator or multivibrator 20, one or more intermediate amplifier and pulse shaping circuits 22, and an output module 24. The output module, as is well known in the EDM art, includes one or more electronic switches which are connected between a DC power source and the gap. Responsive to the triggering pulses from the multivibrator 20, the electronic switch is turned on and off to furnish machining power pulses across the machining gap or gaps. In the drawing, two gaps are shown with two electrodes $E_1,E_2$ and two workpieces $W_1,W_2$. The workpieces $W_1,W_2$ are supported by a work table 26 while the electrodes $E_1,E_2$ are generally mounted on a common ram and operated by a hydraulic motive means 28 which is controlled in its upward or downward movement by an electromagnetic servo valve 29 with an associated electrically energized element embodied as a coil 30 shown in the upper righthand part of the drawing and mounted between terminals Y and Z. Movement of the hydraulic motor is responsive to the direction and magnitude of current flow through the coil 30. The present invention is directed toward an improved servo feed circuit which provides faster response characteristic and eliminates the inherent inductance in the valve coil 30.

A reference voltage potentiometer 32 and a reference adjustment potentiometer 34 provide one input to the servo feed circuit. The lower end of the potentiometer 34 is grounded through a diode 36. A second input to the servo system is provided by a gain adjust or sensitivity potentiometer 40 which is used for course adjustment. A second potentiometer 42 is included in the circuit to allow for fine adjustment of gain. Potentiometers 40 and 42, as well as 32, are usually available for selective adjustment by the operator. The third input to the servo control circuit is provided by a pair of sensing leads attached to electrodes $E_1,E_2$ with junctions at points A and B. A pair of like oriented diodes 44 are coupled to a common junction at point C while a negative voltage source is connected through a resistor 46 to the same point. There are included as the basic operating elements in the circuit three amplifier stages 50, 52, and 54. It will be seen that the amplifiers 52 and 54 are connected by series resistors 56 and 58. The gain adjust potentiometer 40 actually grounds the junction point D of resistors 56 and 58. Thus, according to the way in which potentiometer 40 is adjusted, if we wish to have a low gain for more stability of cutting, the potentiometer will be turned one way such as to short point D to ground. If we desire high gain, the potentiometer is turned in the opposite position to provide high impedance to ground.

In the servo circuit, the lowest gap voltage signal input such as at points A and B will be the one that controls the operation of the amplifier 50. The amplifier 50 serves another important purpose. One of the problems with servo controlled EDM is that most of the important electrical information from the machining gap is contained in the lower third of the machining voltage range. In other words, if you have a 70 volt supply voltage, most of the information is contained around 28 to 30 volts. Once the gap dielectric breaks down and the current begins to flow, the gap voltage is approximately 28 volts. Yet in prior art servo systems, while the servo circuit is trying to look at a 70 volt level pulse, it breaks down to a 28 volt level and there is a lot of voltage in the information that means nothing. Otherwise stated, all of the voltage between the 30 and 70 volt level is the downfeed information. As soon as the gap strikes, the voltage level drops to 30 volts so that the range between zero and 30 volts constitutes upfeed information. This does not cause an appreciable problem when operating with the standard voltage level of approximately 70 volts. However, when operating at a high voltage level of about 200 volts, there are 170 volts of downfeed information and 30 volts of upfeed information. This can result in a pounding action because of gap voltage excursions from 200 volts to 30 volts. This causes a very non-linear operating situation. Amplifier 50 is included to amplify the information sensed from the gap so that the amplifier would raise, for example, 30 volt information pulse to 50 volts, 70 volts to 100 volts, and 200 volts to 300 volts. Since the amplifier 50 can only reproduce a limited range of voltage, it actually clips off or clamps and then places the approximately 30 volts of desired information directly into the linear operating range in the amplifier 50. Thus we are able to eliminate the unwanted information from 50 volts to 200 volts.

The output of the amplifier 50 as applied to the input of the next following amplifier stage 52 which operates as an operational amplifier and is used to sum the gap voltage and the reference voltage from potentiometer 54. The modified gap voltage signal is passed from amplifier 50 through the resistor 60 and summed with the reference voltage from the potentiometer 34. It will be seen that external biasing resistors 62, 64, 66 are connected to the amplifier 50. The amplifier 52 further has connected to it a ground connection through a capacitor 68. The plus input terminal of amplifier 52 is grounded through a resistor 70 and a feedback is provided through a further series resistor 72 connected as shown. Appropriate plus and minus voltages are applied to operate the amplifier 52. The final amplifier stage in the servo control circuit is the amplifier 54 which is a power amplifier that finally drives the servo valve coil 30. An additional potentiometer 72 with series resistors 74 and 76 is connected across plus and minus operating voltages. This potentiometer may be adjusted to change the offset voltage of the amplifier 54.

The output of the amplifier 54 passes through a resistor 82 into the terminal Z of the servo coil 30. After the control current passes through the coil 30, it is returned to ground through a resistor 84. The voltage developed across the resistor 84 represents the current of the coil passing through the coil 30. The feedback voltage across a resistor 86 which is connected back to the negative input terminal of the amplifier 54 is summed with the voltage across resistor 58. The use of the power amplifier 54 and feedback to it of current greatly shortens the response time of the servo valve 29. The effect of the inductance of the valve is mainly eliminated.

It will thus be seen that we have provided by our invention an improved faster acting and more reliable servo system for electrical discharge machining.

We claim:

1. In an electrical discharge machining apparatus for machining an electrically conductive workpiece by an electrode across a dielectric coolant filled gap, a servo feed circuit for controlling the movement of said electrode comprising:

a motive means for moving the electrode upwardly and downwardly during machining;
    an electrically energized element of the inductive type for controlling the operation of said motive means and its direction of movement;
    a sensing circuit connected to the gap for providing an output signal representative of gap voltage level;
    an amplifier for amplifying and clipping the gap voltage signal to provide a modified signal;
    a reference voltage source;
    a summing amplifier for summing the reference voltage signal and the modified gap voltage signal; and
    a power amplifier receiving its input from the summing amplifier to its input terminal and having its output terminal operably connected to one terminal of said electrically energized element and having its input terminal operably connected to the other terminal of said electrically energized element for providing current feedback through said electrically energized element.

2. The combination, as set forth in claim 1, wherein said electrically energized element of the inductive type comprises a servo valve coil and said motive means comprises an electromagnetically controlled hydraulic motor.

3. The combination, as set forth in Claim 1, wherein a further adjustment potentiometer is coupled to said power amplifier input for adjusting its offset.

4. The combination, as set forth in Claim 1, wherein a gain adjust potentiometer is further connected as an input to said power amplifier for adjusting the overall system sensitivity.

5. In an electrical discharge machining apparatus for machining an electrically conductive workpiece by a plurality of electrodes across a dielectric coolant filled gap, a servo feed circuit for controlling the movement of said electrodes comprising:

a motive means for moving the electrodes upwardly and downwardly during machining;
    an electrically energized element of the inductive type for controlling the operation of said motive means and its direction of movement;
    a sensing lead corresponding to each such electrode and having a like poled diode connected in it;
    said diodes having a common terminal to provide an analog "or" stage to select the lowest level one of the gap voltage signals;
    an amplifier for amplifying and clipping such gap voltage signal to provide a modified signal;
    a reference voltage source;
    a summing amplifier for summing the reference voltage signal and the modified gap voltage signal; and
    a power amplifier receiving its input from the summing amplifier to its input terminal and having its output terminal operably connected to one terminal of said electrically energized element and having its input terminal connected to the other terminal of said element for providing a current feedback path through said electrically energized element to said input terminal of said power amplifier.

6. The combination, as set forth in claim 5, wherein a gain adjustment potentiometer is further connected as an input to said power amplifier for adjusting its sensitivity.

7. The combination, as set forth in claim 5, wherein said electrically energized element comprises a servo valve coil and said motive means comprises an electromagnetically controlled hydraulic motor.

* * * * *